March 21, 1967   T. G. WERDER ETAL   3,310,087
SLICING MACHINE LOAF CARRIER
Original Filed Nov. 28, 1961   5 Sheets-Sheet 3
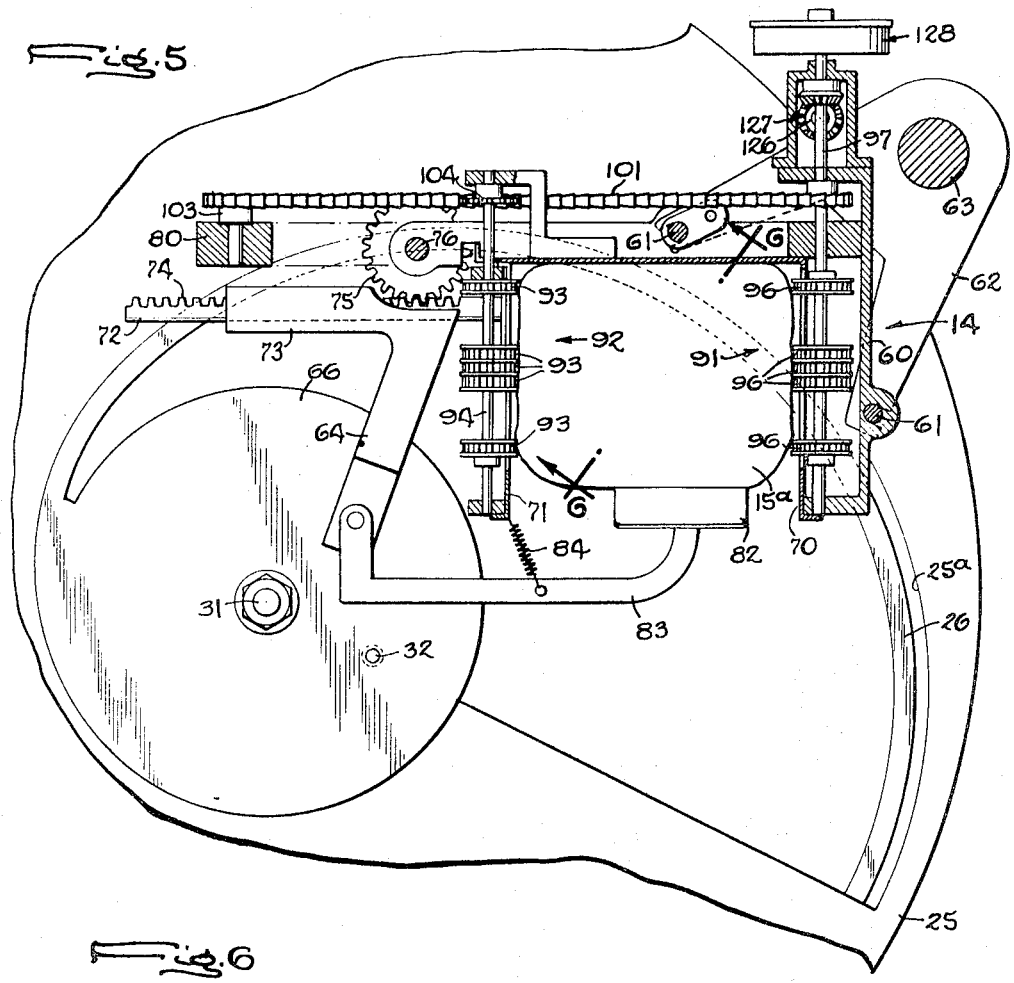
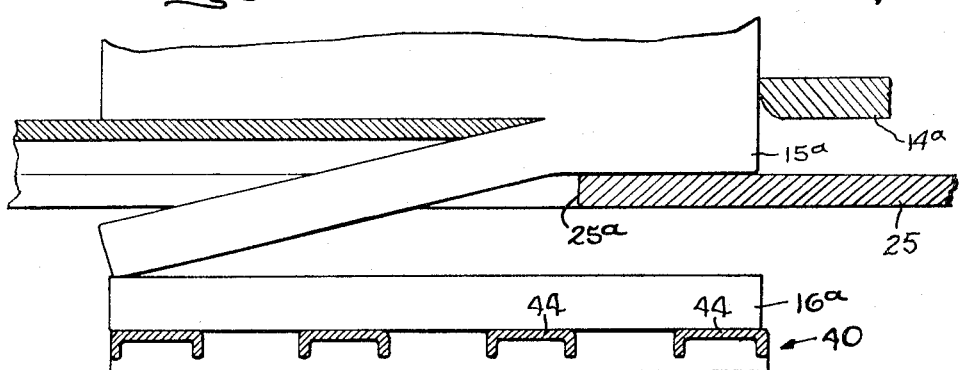
INVENTORS
Theodore G. Werder
Hilmar O. Schuetze
ATTORNEYS

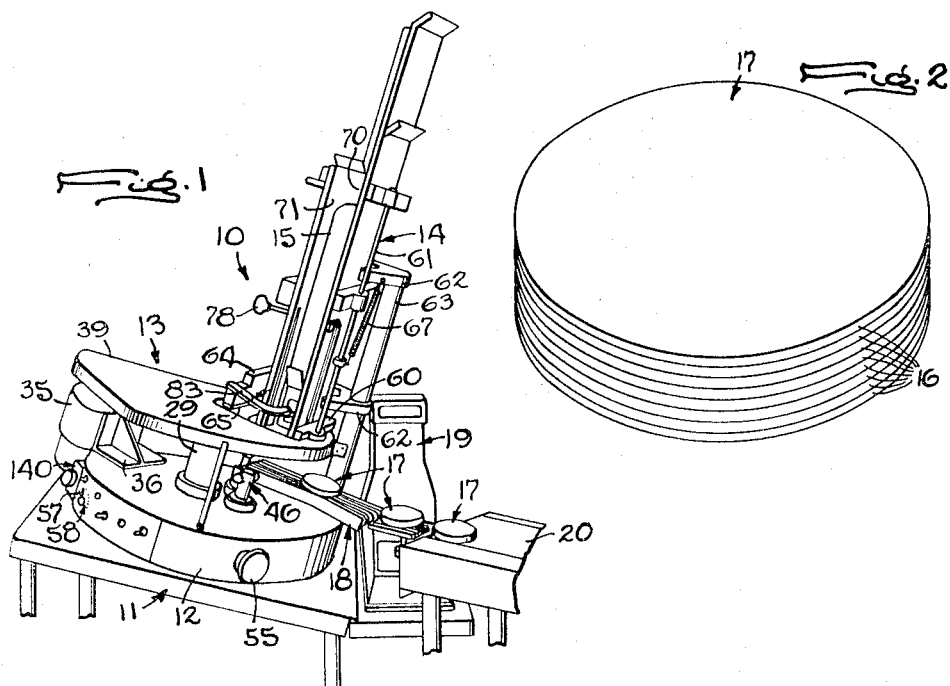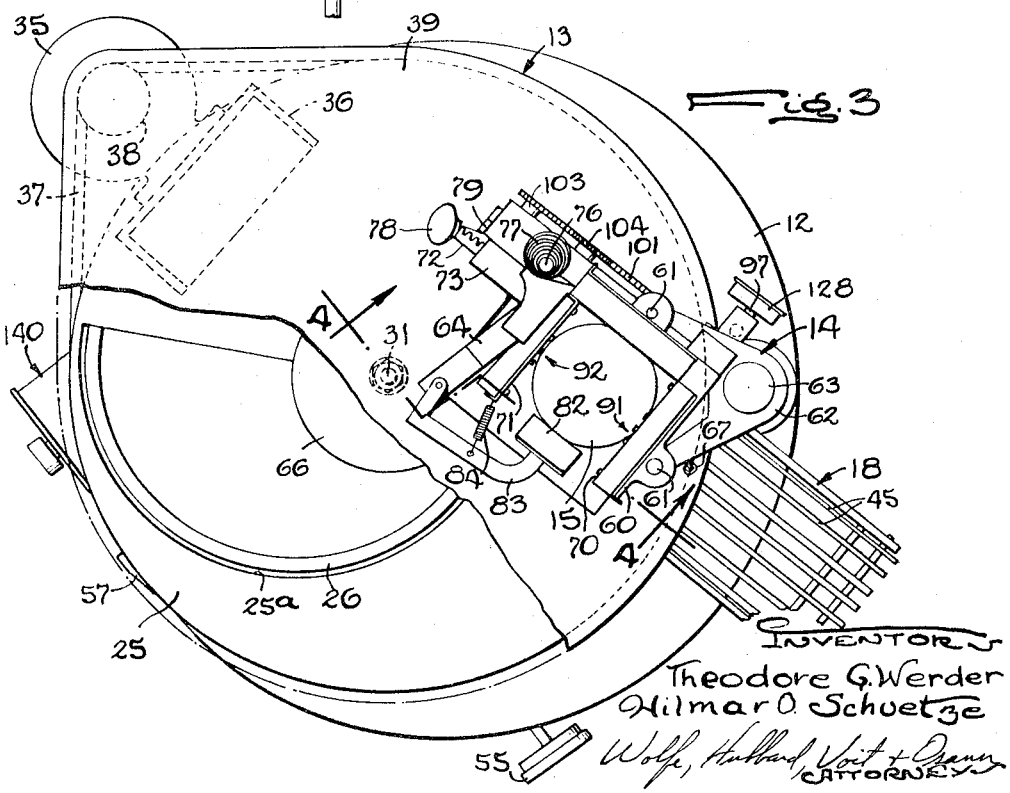

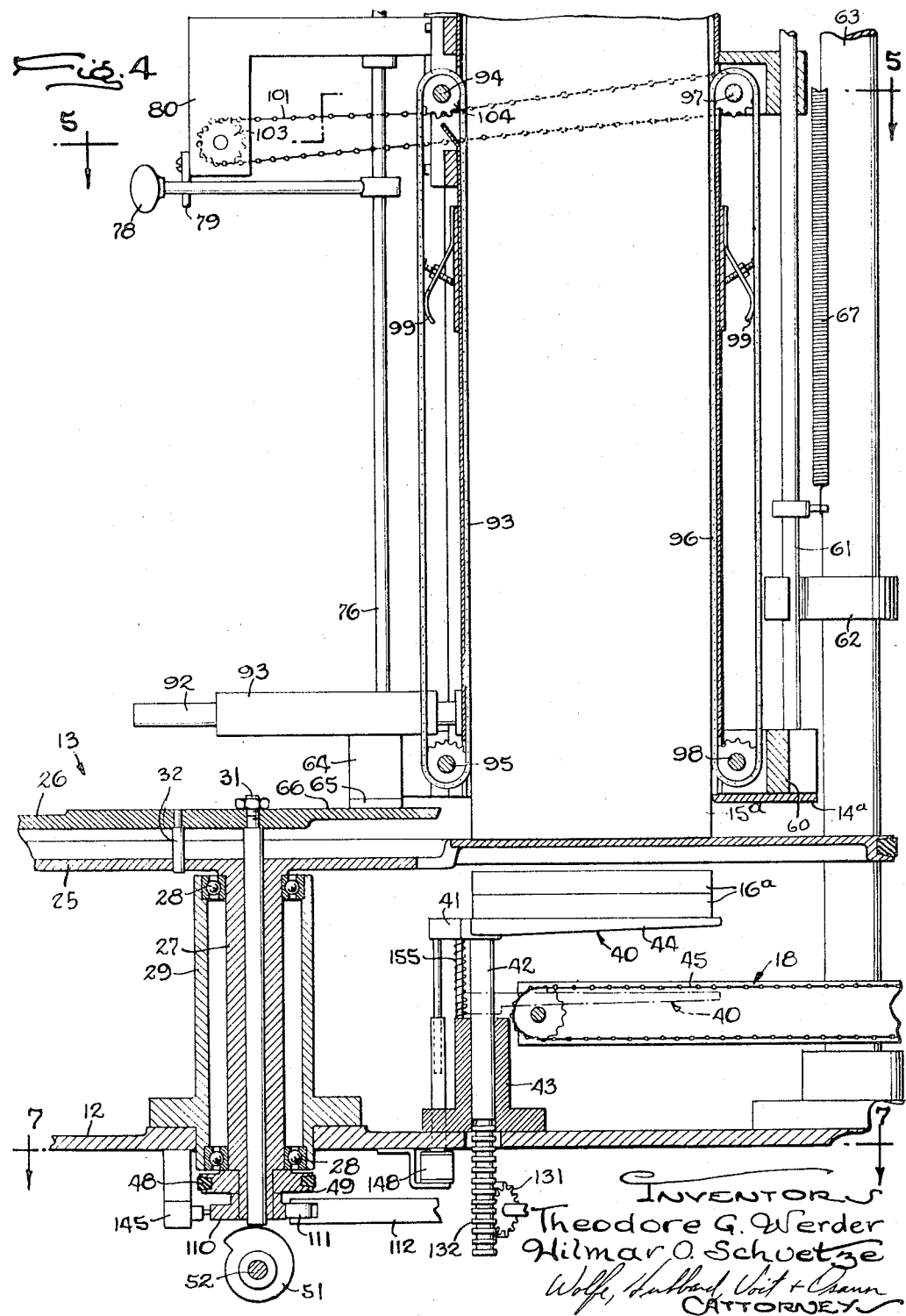

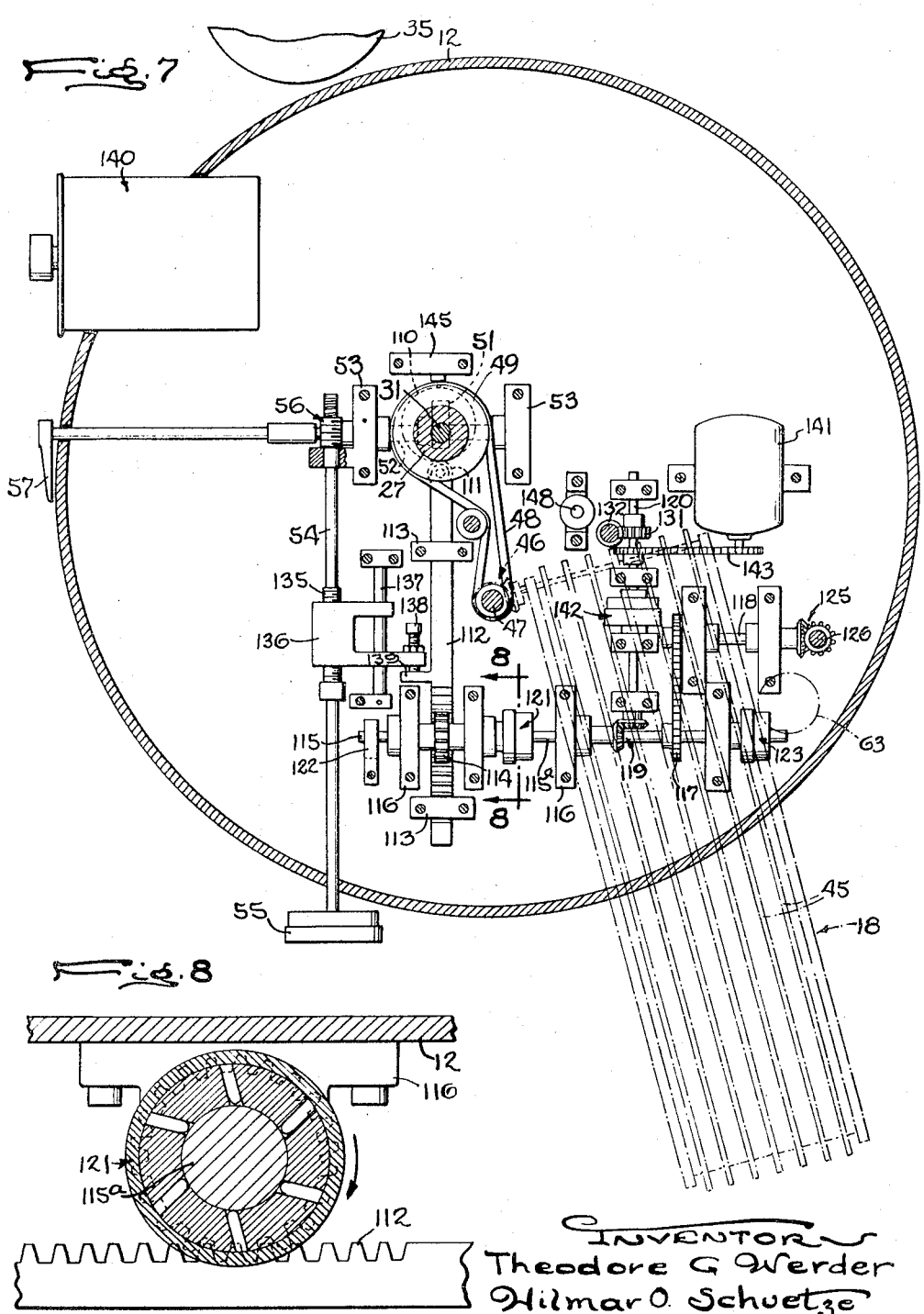

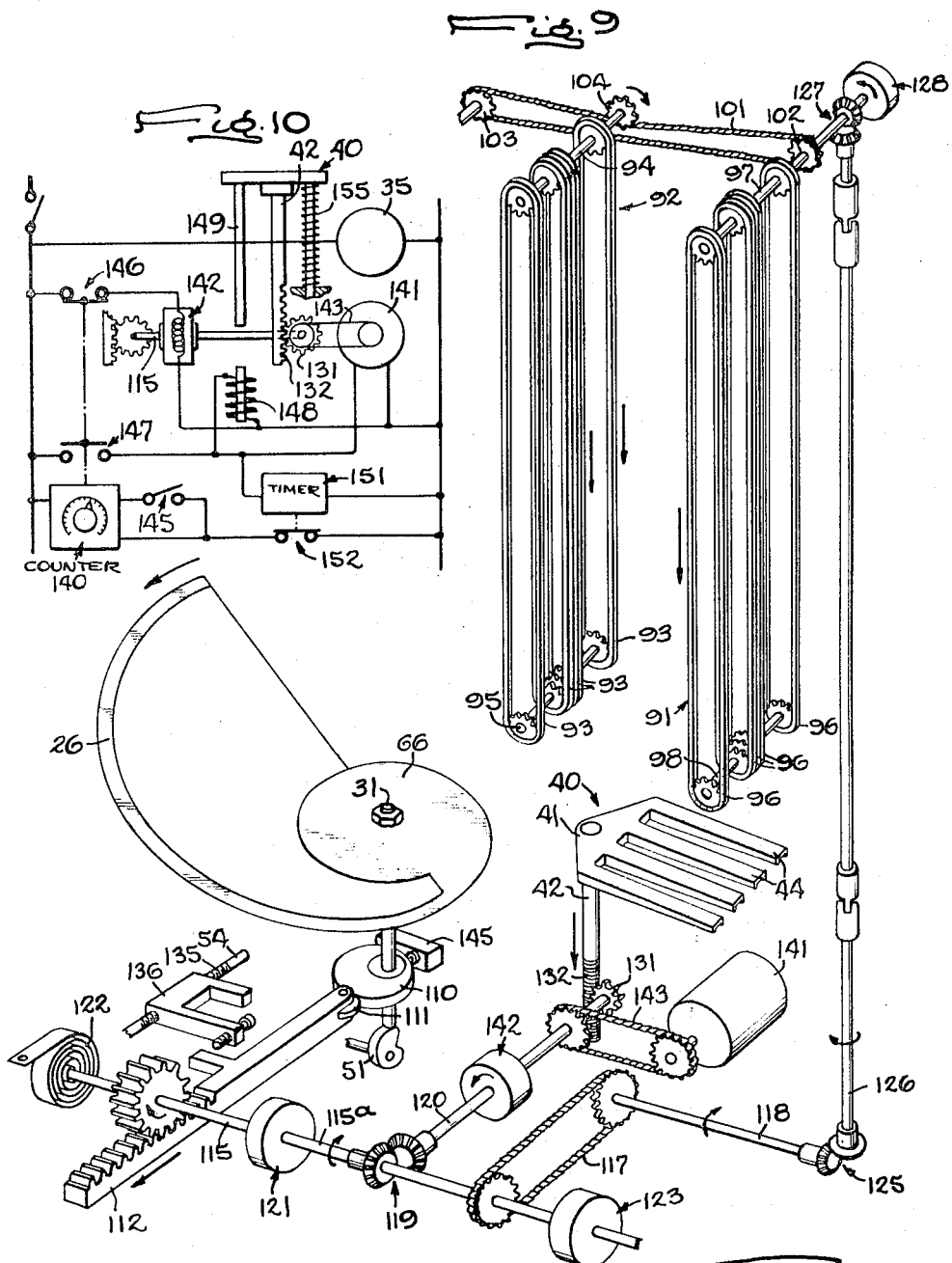

3,310,087
SLICING MACHINE LOAF CARRIER
Theodore G. Werder, Chicago, and Hilmar O. Schuetze, Des Plaines, Ill., assignors to Great Lakes Stamp & Mfg. Co., Inc., Chicago, Ill., a corporation of Illinois
Original application Nov. 28, 1961, Ser. No. 155,270, now Patent No. 3,161,215, dated Dec. 15, 1964. Divided and this application May 29, 1964, Ser. No. 378,090
2 Claims. (Cl. 146—217)

This invention relates generally to food handling machinery and more particularly concerns a slicing and stacking machine.

This application is a division of our co-pending application Ser. No. 155,270, filed Nov. 28, 1961, now Patent No. 3,161,215, issued Dec. 15, 1964.

Various kinds of sausage and many specialty food products are conventionally formed in long loaves. It has become common to market these products in packaged stacks of slices formed by slicing the loaves transversely, stacking the slices to make a desired package weight and wrapping the stacks.

It is an object of the invention to provide a slicing machine for uniformly slicing a product loaf and disposing the slices in properly alined stacks, and which functions with complete reliability with all conventional products of whatever configuration and whether the loaf is long or short.

Another object is to provide a slicing machine of the above type which permits accurate slice thickness adjustment, while the machine is in operation, all the way through a product loaf. In this way, precise control of the resulting stack weight can be maintained at all times.

A further object is to provide a slicing machine as characterized above in which the number of slices in each stack formed can be exactly selected, while the machine is in operation, and which forms and maintains precisely alined stacks with all slice thicknesses and stack heights.

It is another important object to provide a slicing machine of the type described above which accepts successive product loaves while in operation and which functions continuously from loaf to loaf without slowdown or interruption.

In more detail, it is an object to provide a slicing machine of the above character which maintains positive control of the product at all times during the slicing and stacking operation, in all slice thicknesses and stack height settings, and which, therefore, is able to function at high speed with complete reliability.

It is also an object to provide a slicing machine as described above which is rugged and easily serviced so as to be well suited for commercial production line use.

Other objects and advantages of the invention will become apparent upon reading the following detailed description and upon reference to the drawings, in which:

FIGURE 1 is a fragmentary prespective of a slicing machine constructed in accordance with the invention;

FIG. 2 is a perspective of a stack of food product slices prepared by the machine of FIG. 1;

FIG. 3 is an enlarged plan of the machine shown in FIG. 1 with portions broken away;

FIG. 4 is a further enlarged fragmentary section taken approximately along the line 4—4 of FIG. 3;

FIG. 5 is a fragmentary section taken approximately along the line 5—5 in FIG. 4;

FIG. 6 is an enlarged fragmentary section taken approximately along the line 6—6 in FIG. 5;

FIG. 7 is a section taken along the line 7—7 in FIG. 4;

FIG. 8 is a further enlarged fragmentary section taken approximately along the line 8—8 of FIG. 7;

FIG. 9 is a partially diagrammatic perspective of the drive mechanisms embodied in the machine shown in FIG. 1; and FIG. 10 is a schematic diagram of the control circuit for the mechanisms shown in FIG. 9.

Turning now to FIG. 1, there is shown a slicing machine 10 embodying the invention and including an inclined frame 11 having a control housing 12 above which is supported a cutting assembly 13 and a product loaf carrier 14. A food product loaf 15 is supported in the carrier 14 and sliced by the cutting assembly 13 into individual slices 16 which are arranged in stacks 17. The stacks 17 are fed by a discharge conveyor 18 to a check weighing scale 19 from which they move to a packaging conveyor 20. Simply for comparison purposes, the product loaf 15 in FIGS. 1 and 3 and the slices 16 in FIG. 2 are shown round in section with the slices being thin, whereas in FIGS. 4, 5 and 6, a square sectioned loaf 15a is shown being severed into relatively thick slices 16a. Commercial machines of the type herein described effectively slice loaves of all standard cross sections and easily form uniform slices of any desired thickness from ½ inch down to less than 1/16 inch.

The cutting assembly 13 includes a circular table 25 having an overlying spiral slicer blade 26 both of which, in the illustrated construction, are mounted for rotation beneath the carrier 14. The table 25 is formed with a depending sleeve 27 which is supported in bearings 28 mounted in a post 29 that is rigidly secured to the housing 12 of the frame 11 (see FIG. 4). The blade 26 is secured to a shaft 31 which is slidably received within the sleeve 27. A pin 32 locks the table 25 and the blade 26 against relative rotation so that the table and the blade rotate in unison beneath the product loaf in the carrier 14.

To rotate the blade 26, a main drive motor 35 is secured to a bracket 36 on the control housing 12 and is coupled by a belt 37, trained about a motor pulley 38 and the periphery of the table 25, to the table and the slicer blade 26. When energized, the drive motor 35 rotates the table 25 and the slicer blade 26 in a counterclockwise direction as seen in FIGS. 3 and 5. Preferably, a shield or cover 39 is provided to overlie and surround the cutting table 25, the slicer blade 26, the motor pulley 38 and the belt 37.

With the machine 10 in operation, the loaf is supported in the carrier 14 with its lower surface just above the table 25. Upon each revolution of the table and the slicer blade, a slice is cut from the bottom of the loaf having a thickness depending upon the spacing of the slicer blade 26 above the lower surface of the loaf. The spiral blade 26 produces a smooth, slicing cut without a chopping or tearing effect and thus clean, even slices are formed with all types of common food products.

As a feature of the invention, the carrier 14 supports shear blocks 14a facing the spiral cutting edge of the blade 26 and having their lower surfaces positioned just above the plane of the slicer blade (see FIGS. 4 and 6). The blade 26 acts against the shear blocks 14a with a scissorslike effect that further insures a smooth slicing action. Preferably, the shear blocks 14a are formed of hardened steel and the upper surface of the slicer blade edge slides along the lower surfaces of the blocks upon each revolution of the blade. This produces a honing effect that greatly lengthens the useful effective operating life of the slicer blade before resharpening is required. The edges of the blocks 14a facing the blade 26 are rounded to guide the blade edge beneath the blocks.

The slices severed from the loaf drop downwardly through a discharge port 25a, formed in the table 25 beneath the slicer blade 26, onto a vertically movable stacking platform 40. The platform 40 includes a slidable frame 41 mounted on a rod 42 which is reciprocable in a collar 43 secured to the upper surface of the housing 12. A plurality of fingers 44 are formed with the frame 41 so as to be movable from a starting position just below the table 25 to a discharge position wherein the fingers 41 pass between and below a plurality of chains 45 making up the discharge conveyor 18 (see FIGS. 4 and 6). The discharge position of the platform 40 is shown in dashed lines in FIGS. 4 and 6.

The discharge conveyor chains 45 are constantly driven through bevel gearing 46 (see FIG. 7) which couple the chains to a drive post 47 journalled within the housing 12 that is constantly rotated by a belt 48 from a pulley 49 on the table sleeve 27 (see also FIG. 4). It will therefore be apparent that when the platform 40 is driven to its discharge position, with the fingers 44 between and beneath the conveyor chains 45, the slice or slices on the platform fingers will be engaged by the constantly driven chains 45 and carried from the platform to the check weighing scale 19.

So as to vary the thickness of the slices cut by the machine 10, the slicer blade 26 is axially adjustable relative to the table 25 and for this purpose the blade shaft 31, that is slidably received within the table sleeve 27, rests on a lift cam 51 mounted on a cam shaft 52 that is rotatably supported on the underside of the housing 12 by a pair of bearing blocks 53. To adjust and hold the cam shaft 52 in a desired angular position, a setting shaft 54 having an adjusting knob 55 is connected through worm gearing 56 to the cam shaft 52. It can thus be readily seen that manual operation of the knob 55 permits the cam shaft 52 to be rotated so that the lift cam 51 vertically positions the blade 26 relative to the upper surface of the cutting table 25. Preferably, a pointer 57 is mounted on the cam shaft 52 on the outside of the housing 12 so as to be clearly visible to the operator of the machine 10. The pointer 57 cooperates with a scale 58 (see FIG. 1) to indicate the setting of the blade 26 in terms of the thickness of the slice which will be cut from the loaf in the carrier 14 upon rotation of the cutting table and the blade.

The loaf carrier 14 includes a subframe 60 having rods 61 which are slidably fitted in yokes 62 rigidly secured to a pedestal 63 which forms a part of the machine frame 11. The carrier subframe 60 supports the shear blocks 14a (see FIG. 4) and also includes an arm 64 carrying an underlying nylon pad 65 which rests on an inner circular surface 66 of the blade 26. The arm 64 thus transfers the weight of the carrier 14 to the blade 26 through the friction reducing pad 65 so that the carrier subframe slides up and down with the thickness adjustment of the blade 26. Preferably, a tensioned helical spring 67 is extended between one of the rods 61 and the upper yoke 62 so as to relieve part of the weight of the carrier 14 from the blade 26. Since the carrier 14 in effect floats on the blade 26, it will be understood that the loaf supporting carrier, including the shear blocks 14a, is always kept at the proper cutting relationship to the slicer blade in all of the latter's positions of adjustment.

To contain the product loaf, an L-shaped trough 70 is mounted on the subframe 60 and a movable wall 71 is positioned normal to one of the walls of the trough 70 and facing the other wall of the trough. The movable wall 71 is carried by a pair of rods 72 which are slidably received in blocks 73 forming portions of the carrier subframe 60. The rods 72 are formed with rack teeth 74 that are in meshing engagement with respective pinions 75, of which only one is shown in FIG. 5, that are mounted on a shaft 76 which is journalled on the subframe 60 parallel to the movable wall 71. A torsion spring 77 at the top of the shaft 76 (see FIG. 3) biases the shaft in a counterclockwise direction as seen in FIGS. 3 and 5 so that the rods 72, and thus the movable wall 71, are resiliently urged toward the opposite wall of the trough 70. The spring 77 thus causes the movable wall to exert a gripping force on the product loaf within the carrier 14.

To permit the carrier 14 to be easily loaded, a handle 78 is rigidly secured to the shaft 76 so that the shaft can be conveniently rotated in a clockwise direction to carry the movable wall 71 away from the product loaf. Preferably, a latch 79 is pivoted on an arm 80 forming a part of the carrier subframe 60 to permit the handle 78 to be latched against the force of the spring 77, thereby holding the movable wall 71 away from the opposite wall of the trough 70 and permitting the operator of the machine 10 to properly set a new product loaf into the carrier.

To further guide and position the product loaf, an elongated shoe 82 is mounted on a bar 83 that is pivoted on the arm 64. The shoe 82 is biased by a tensioned spring 84 so that the shoe presses inwardly between the movable wall 71 and the opposite wall of the trough 70.

For positively feeding the product loaf toward the slicer blade 26, the carrier 14 includes opposed conveyor 91 and 92 mounted on the trough 70 and the movable wall 71, respectively. The conveyor 92 is formed by a plurality of chains 93 extending between sprockets on upper and lower shafts 94 and 95 journalled on the movable wall 71. The inner runs of the chains 93 pass over the inner surface of the movable wall 71 so that the chains directly grip the product loaf mounted in the carrier 14. The conveyor 91 is formed by a plurality of chains 96 which are trained about sprockets on upper and lower shafts 97 and 98 journalled on the wall of the trough 70 so that the chains 96 oppose the chains 93 of the conveyor 92. Resilient spacers 99 mounted on the outer surface of the movable wall 71 and on the outer surface of the trough 70 tension the respective chains 93, 96 (see FIG. 4).

For simultaneous, but opposite, rotation of the conveyor chains 93, 96, a drive chain 101 is trained about a sprocket 102 on the shaft 97 and an idler sprocket 103 journalled on the carrier subframe arm 80 (see FIGS. 4 and 9). A sprocket 104, secured to the shaft 94 on the movable wall 71, is disposed in meshing engagement with the drive chain 101 so as to ride along the chain 101 when the movable wall is shifted. Thus, the chains 93, 96 of the conveyors 91, 92 remain interconnected for simultaneous, but opposite, rotation in all positions of adjustment of the movable wall 71.

In accordance with the invention, the conveyors 91, 92 are driven, and the platform 40 is lowered, in incremental steps each time the blade 26 rotates past the carrier 14, with the magnitude of the steps being maintained approximately equal to the spacing of the blade above the cutting table 25 in all positions of blade adjustment. In other words, the product loaf is fed downwardly by the conveyors 91, 92 in steps equal to the slice thickness being severed from the loaf so that the loaf is always in proper position for cutting by the blade 26 with the slices formed by the machine remaining uniform. Dropping of the platform 40 in steps equal to the thickness of the slice being formed maintains the platform 40, or the top of the stack of slices on the platform, at always the right level to receive subsequent slices in proper stacked alinement.

The function of the conveyors 91, 92 in controlling the feed of the product loaf is particularly important to appreciate. The loaf is not free to drop under the influence of gravity, but rather the conveyors grip the loaf and positively control both the time at which the loaf is advanced toward the plane of the rotating blade 26 as well as the distance through which the loaf is advanced, the latter factor determining the slice thickness. Because of the positive feed control, slice thickness can be precisely set and is accurately maintained, and the lower end of the loaf is kept in the desired relationship to the table 25, i.e., just above and out of wiping engagement with the table. The lower end of the loaf is not, therefore, pressed against and mushroomed out on the table and the table does not wipe against the loaf to extract fatty elements which may be in the loaf.

For driving the conveyors 91, 92 and the platform 40 in incremental steps, a drive cam 110 is secured to the blade shaft 31 so as to cooperate with a cam follower 111 journalled on the end of a rack 112 (see FIGS. 4, 7 and 9). The rack 112 is supported by a pair of blocks 113 for sliding movement within the housing 12. Cooperating with the teeth on the rack 112 is a pinion 114 secured to a drive shaft 115 that is journalled in a plurality of bearing blocks 116 within the housing 12. A chain 117 couples the drive shaft 115 to a conveyor drive shaft 118, and bevel gearing 119 couples the drive shaft 115 to a platform drive shaft 120.

The shaft 115 includes a portion 115a which is coupled thereto through a one-way clutch 121 arranged so that driving movement of the rack in the direction of the arrows shown in FIG. 9 rotates the pinion 114, and thus the shaft 115, to "lock up" the clutch 121 and rotate the shaft portion 115a in unison with the shaft 115. When the high point of the cam 110 passes the cam follower 111, a torsion spring 122 rotates the shaft 115 in a reverse direction so as to return the rack 112 to its starting position in the direction opposite to the arrow appearing in FIG. 9. During this return movement, the clutch 121 rotates idly so that the shaft portion 15a is not driven in the return direction of the shaft 115. To positively prevent return rotation of the shaft portion 115a, a second one-way clutch 123 is provided to lock the shaft portion 115a to the housing 12 upon a tendency of the shaft portion to rotate in a direction opposite to the arrow appearing in FIG. 9. This clutch 123, of course, permits free rotation of the shaft portion 115a in the direction of the arrow.

It will thus be apparent that continuous rotation of the cam 110 will cause oscillation of the drive shaft 115 and stepping rotation of the drive shaft portion 115a. This stepping rotation is transferred through the chain 117 and the bevel gearing 119 to the carrier conveyor drive shaft 118 and the platform drive shaft 120, respectively.

The conveyor drive shaft 118 is connected through a set of bevel gears 125 to a long coupling shaft 126 which is journalled on the carrier 14 and rotatably coupled through another set of bevel gears 127 to the shaft 97 forming a part of the conveyor 91. Preferably, a frictional drag mechanism 128 is also connected to the shaft 97 so as to prevent coasting or free-wheeling of the conveyors. Rotational stepping movement of the drive shaft portion 115a thus causes downward stepping of the conveyors 91, 92.

The platform drive shaft 120 carries a pinion 131 which is in meshing engagement with a plurality of rack teeth 132 formed on the platform shaft 42. In this way, rotational stepping movement of the drive shaft portion 115a causes downward movement of the rack 40 in incremental steps.

To couple the slice thickness adjusting mechanism to the drive for the conveyor 91, 92 and the platform 40, the cam setting shaft 54 is formed with a helically threaded section 135 which threadably engages a stop block 136 that is slidably mounted on a rod 137 secured within the housing 12. The block 136 carries an adjustable stop 138 which cooperates with a lug 139 on the rack 112 to arrest return movement of the rack under the biasing force of the spring 122.

It can be seen that the magnitude of the steps through which the conveyors 91, 92 are driven, and the platform 40 is lowered, depends upon the distance the rack 112 is moved by the cam 110 during each revolution of the blade 26. This distance, in turn, is determined by the starting position of the rack to which it is returned by the spring 122 before being again driven by the cam 110. Since the stop block 136 arrests return movement of the rack 112 and determines the starting position from which the rack is driven by the cam 110, it will be seen that the position of the block 136 controls the magnitude of the steps through which the conveyors and the platform are advanced each time the rack is actuated by the cam 110.

Rotation of the cam setting shaft 54, through manipulation of the knob 55, not only positions the lift cam 51 so as to space the blade 26 at a selected distance above the cutting table 25, but also positions the stop block 136 relative to the rack 112 by virtue of the threaded engagement between the section 135 and the block 136. The adjustable stop 138 is positioned and fixed so that the slice thickness determined by the positioning of the blade 26 is approximately equal to the incremenetal steps through which the conveyors 91, 92 are driven and the downward steps through which the platform 40 is lowered. When the lift cam 51 is turned by the setting shaft 54 to raise the blade 26 and increase the slice thickness, the stop block 136 is driven toward the cam 110 so as to increase the throw of the rack 112 and the magnitude of the steps through which the conveyors 91, 92 are driven and the platform 40 is lowered. The reverse adjustment is of course the same. In this way, setting of the single knob 55 positions the blade 26 relative to the cutting table 25 and also adjusts the drive for the loaf conveyors 91, 92 and the stacking platform 40. As a result, the loaf is always fed in the proper amounts to insure uniform and accurate slicing and the platform is always lowered at the proper rate to insure uniform stacking.

As a further feature of the invention, a settable counter 140 is provided to control a platform clearing drive including a motor 141 and an electric clutch 142 so as to permit selection of the number of slices in each stack formed by the machine 10. The electric clutch 142 is interposed in the shaft 120 so that a drive is maintained from the bevel gears 119 to the platform sprocket 131 only when the clutch is energized and engaged. The motor 141 is coupled to the declutchable portion of the shaft 120 by a chain 143. It will thus be apparent that when the clutch 142 is deenergized and the motor 141 energized, the platform drive shaft 120 is disconnected from the main drive shaft 115 and is rotated by the motor 141. The motor operates to quickly drive the platform downwardly to its discharge position, established by abutment of the frame 41 with the upper surface of the collar 43.

The operation of the motor 141 and the clutch 142 under the control of the counter 140 can be best understood by briefly reviewing the exemplary control circuit shown in FIG. 10. The counter 140 is first set to the number of slices desired in each stack to be produced by the machine 10. The counter is stepped by the closing of a normally open switch 145 which is operated once upon each revolution of the slicer blade 26 by the cam 110 (see also FIGS. 4 and 9). When the switch 145 has been operated a sufficient number of times to step the counter 140 to the set position, the counter opens a set of normally closed contacts 146 and closes a set of normally open contacts 147. Opening the contacts 146 deenergizes the clutch 142 so as to free the drive to the platform 40 from the main drive shaft 115. Closing the contacts 147 energizes the motor 141 so as to quickly drive the platform 40 through the remaining distance required to bring it to its discharge position illustrated in dashed lines in FIGS. 4 and 6.

As each step of the counter 140 coincides with the dropping of another slice on the platform 40, the number of slices on the platform when the counter energizes the motor 141 to bring the platform to its discharge position equals the setting of the counter. As explained above, as soon as the platform reaches its discharge position, the stack of slices is carried away by the continuously driven belts 45 of the discharge conveyor 18.

So as to avoid bounce or rebound of the platform when the motor 141 drives it to its discharge position, an electromagnet 148 is mounted just beneath the housing 12 so that a rod 149 depending from the platform 40 comes into close proximity to the coil of the magnet 148 when the platform 40 is in its discharge position. Closing of the contacts 147 by the counter 140 energizes the electromagnet 148 simultaneously with energization of the motor 141, and thus the rod 149 is attracted and momentarily held by the lectromagnet to restrain and dampen any tendency of the platform to bounce or rebound as it moves quickly into its discharge position.

Also energized by the closing of the contacts 147 is a timer 151 which, following a brief period of energization, is effective to open a set of normally closed contacts 152 that are effective to deenergize and reset the counter 140. Thus, the contacts 146 remain open and the contacts 147 remain closed only for the brief interval required to time out the timer 151 and this period is, of course, selected to provide sufficient time to drive the platform 40 to its discharge position. Upon opening of the contacts 152 by the timer 151, the counter is restored to its initial reset position with the contacts 147 being open to deenergize the motor 141, the electromagnet 148 and the timer 151, and the contacts 146 being closed to reenergize the clutch 142. The contacts 147 open a moment before the contacts 146 reclose so as to allow a platform biasing spring 155 time for snapping the platform 40 upwardly to its starting position. The operating cycle is then repeated and another stack of slices is formed on the platform with the number of slices in the stack being determined by the setting of the counter 140 and the thickness of each slice being indicated on the scale 58. Preferably, the speed of the motor 141 and the delay period measured by the timer 151 is such that the platform 40 is driven to its discharge position and returned to its starting position in less time than is required for the blade 26 to complete one revolution. There are thus no "lost" slices, nor is there any need to interrupt the slicing operation while the previously sliced stack is transferred to the discharge conveyor 18.

It is important to note that the settings of the knob 55 and the counter 140 can be changed while the slicer is in operation without danger to the machine. Package weight can therefore be accurately controlled, and desired changes made in the run, without time consuming shut-downs or special skill being required.

Moreover, since the product loaf is gripped by the conveyors 91, 92 at the sides of the lower portion of the loaf, and since the tops of the trough 70 and the wall 71 define a completely open channel, successive loaves can be fed through the machine 10 without slowing down or interrupting the slicing and stacking operation. The attending operator simply places a new loaf in the trough 70 on top of the loaf being sliced. The new loaf slides down under the force of gravity until its lower end is griped by the conveyors 91, 92, whereupon still another loaf can be reduced for placement in the trough 70. The machine functions continuously as loaf after loaf is sliced and stacked.

The components of the machine are rugged and easily accessible for trouble-free operation and convenient servicing.

We claim as our invention:

1. A loaf carrier for a slicing machine comprising, in combination, a frame, an elongated L-shaped trough mounted on said frame, an elongated movable wall mounted on said frame for movement toward and away from, while remaining parallel to, one wall of said trough, said movable wall being positioned adjacent and normal to the other wall of said trough, means for biasing said movable wall toward said one wall, means including a manually operated element for moving and holding said movable wall against said bias, endless feed-conveyor elements mounted on both said movable wall and said one wall in opposed relation, and means for driving said feed-conveyor elements on each side of said walls in all positions of said movable wall.

2. The combination of slaim 1 including an elongated shoe movably mounted on said frame and biased so as to press inwardly between said one wall and said movable wall.

References Cited by the Examiner

UNITED STATES PATENTS

| 1,930,392 | 10/1933 | Hooydonk. | |
|-----------|---------|-----------|---|
| 2,126,458 | 8/1938 | Englen | 146—94 |
| 2,177,470 | 10/1939 | Ahrndt | 146—217 |

WILLIAM W. DYER, Jr., *Primary Examiner.*

W. GRAYDON ABERCROMBIE, *Examiner.*